United States Patent Office 3,574,691
Patented Apr. 13, 1971

3,574,691
PREPARATION OF FACTICE-LIKE PRODUCTS
Gerhard Stolpa, Hilden, Rhineland, and Guntram Walther, Dusseldorf-Eller, Germany, assignors to Henkel & Cie GmbH, Dusseldorf, Holthausen, Germany
No Drawing. Filed Jan. 16, 1968, Ser. No. 698,112
Claims priority, application Germany, Feb. 25, 1967, H 61,958
Int. Cl. C08h 3/00, 9/02
U.S. Cl. 260—399    7 Claims

ABSTRACT OF THE DISCLOSURE

This invention relates to a process for the production of factice-like products which comprises reacting (1) an anhydrous polyunsaturated compound selected from the group consisting of (a) an ester of an alkanepolyol with an acid selected from the group consisting of unsaturated fatty acids having 8 to 22 carbon atoms, unsaturated hydroxy fatty acids having 8 to 22 carbon atoms, resin acids and mixtures of the said acids, and (b) an oxidized polymer of said ester with (2) an anhydrous mixture of disulfurdichloride and a phosphorus halide, and recovering said factice-like products. The invention also relates to the factice-like products so produced which are useful in the same manner as factice.

CLAIM OF PRIORITY

The right of priority is hereby claimed under the provisions of 35 USC 119, based on our corresponding German patent application H 61,958, IVd/39c, filed Feb. 25, 1967, on our behalf.

THE PRIOR ART

Factices produced by the reaction of sulfur or sulfur chloride with unsaturated oils such as rapeseed oil, castor oil or mineral oils are already known. However, the sulfur factices do not possess any fire-resistant properties and their resistance to aging is comparatively low.

According to a previous, not yet published method of working developed by one of us, factice-like materials containing phosphorus are obtained, when polymerized unsaturated fatty acid or resin acid esters of polyvalent alcohols, treated with an oxidizing agent, are reacted with phosphorus halides. A preferred procedure starts with "blown" oils, that is to say with drying or semi-drying oils treated with air at temperatures between 100° and 300° C. However, the polymerization or oxidation process, which has to be continued until a viscosity of at least 1000 to 1500 cp. is obtained, is very time consuming. Moreover, the increased viscosity of the polymeric ester renders their further processing difficult. Therefore, a pronounced interest exists regarding a method in which the oxidation and polymerization process can be omitted or considerably shortened, or which can be effected under more gentle conditions and which enables the utilization of starting materials of low viscosity.

OBJECTS OF THE INVENTION

An object of the present invention is to overcome the drawbacks of previous processes discussed above, in the obtention of factice-like products.

Another object of the invention is to provide a novel process for the preparation of factice-like products, characterized in that esters of unsaturated fatty acids and/or resin acids with polyvalent alcohols and, if so desired, polymerized and/or treated with an oxidizing agent, are reacted with phosphorus halides and disulfurdichloride.

A yet further object of the invention is the development of a process for the production of factice-like products which comprises reacting (1) an anhydrous polyunsaturated compound selected from the group consisting of (a) an ester of an alkanepolyol with an acid selected from the group consisting of unsaturated fatty acids having 8 to 22 carbon atoms, unsaturated hydroxy fatty acids having 8 to 22 carbon atoms, resin acids and mixtures of the said acids, and (b) an oxidized polymer of said ester with (2) an anhydrous mixture of disulfurdichloride and a phosphorus halide, and recovering said factice-like products.

A still further object of the invention is the obtention of factice-like products having a content of phosphorus by the above process.

These and other objects of the invention will become more apparent as the description thereof proceeds.

DESCRIPTION OF THE INVENTION

It has now been discovered that the above objects can be achieved and a factice-like product containing phosphorus can be obtained by a process which is characterized in that esters of unsaturated fatty acids and/or resin acids with polyvalent alcohols and, if so desired, polymerized and/or treated with an oxidizing agent, are reacted with phosphorus halides and disulfurdichloride. Preferably the process comprises reacting (1) an anhydrous polyunsaturated compound selected from the group consisting of (a) an ester of an alkanepolyol with an acid selected from the group consisting of unsaturated fatty acids having 8 to 22 carbon atoms, unsaturated hydroxy fatty acids having 8 to 22 carbon atoms, resin acids and mixtures of the said acids, and (b) an oxidized polymer of said ester with (2) an anhydrous mixture of disulfurdichloride and a phosphorus halide, and recovering said factice-like products.

Glycol esters, glycerides or esters of other polyvalent alcohols, for example, alkanepolyols such as ethylene glycol, glycerol, pentaerythrite, pentite and hexite, of unsaturated natural or synthetic fatty acids having from 8 to 22 carbon atoms, hydroxy fatty acids having from 8 to 22 carbon atoms or resin acids, are considered as starting substances. The hydroxyl groups of the polyvalent alcohols can be esterified, entirely or partly, with the fatty or resin acids. Among the fatty acids and resin acids considered are oleic acid, ricinoleic acid, linoleic acid, pimaric acid, colophonic acid, abietic acid, etc. Preferably natural drying or semi-drying oils are used, for example, linseed oil, rapeseed oil, soybean oil, peanut oil, safflower oil, cottonseed oil, sunflower oil, tall oil, tung oil, fish oils, etc., and especially castor oil which yields relatively light colored products. Mixtures of said esters can also be used.

The starting materials indicated above can be reacted with phosphorus halides and disulfurdichloride, either directly or after a previous bleaching treatment. However, it is also possible to subject these starting materials to a polymerization or oxidation or to a combined polymerization and oxidation treatment.

So far as such a polymerization of the fatty acid or resinic acid esters is intended, this can be accomplished in known manner by heating, either in the absence or in the presence of atmospheric oxygen or catalysts. The polymerization temperatures are at least 50° C. and preferably 80° C. to 300° C.

The oxidation of the monomeric esters can be carried out with the usual oxidizing agents such as atmospheric oxygen, hydrogen peroxide and other inorganic or organic per-compounds, hypochlorites, chlorites, chlorates, perchlorates, oxygen-containing nitrogen compounds, permanganates and the like. The oxidation can be effected simultaneously with the polymerization or subsequently. When solid or liquid oxidizing agents are utilized, the amount is calculated so that the amount of active oxygen to be used is 0.1 to 2 moles, preferably 0.2 to 1.0 mole per 1 mole of the unsaturated acid. Atmospheric oxygen is the preferred oxidizing agent due to its low cost and because it leaves no residue in the end product.

It is particularly advantageous to "blow" the oils, by heating them at temperatures between 100° and 200° C. while bubbling a stream of air or oxygen therethrough until the desired degree of voscosity is obtained. This results in a simultaneous polymerization and oxidation of the oils. If desired, small amounts of oxidation or polymerization accelerators, so-called siccatives, such as oil-soluble lead, manganese, cobalt and iron compounds, can be added before the blowing of the oils. Even in the absence of atmospheric oxygen, polymerized oils, such as stand oil, can be oxidized by a subsequent treatment with any one of the said oxidation agents, using elevated temperatures if desired.

If the fatty acid or resin acid esters, treated in the described manner, still contain substances, which react with phosphorus halides or disulfurdichioride such as water and lower carboxylic acids, these are subsequently removed in the usual manner, for example by heating under vacuum.

The phosphorus halides, suitable for the accomplishment of the proces of the invention are, for example, $PCl_3$, $POCl_3$, $PCl_5$, $PSCl_3$, as well as the corresponding bromine compounds of phosphorus. Also mixtures of the phosphorus halides mentioned in the preceding can be utilized. Preferably phosphorus trichloride is employed as it leads to light colored reaction products. The amount of phosphorus to be reacted in the form of phosphorus halide is from 0.2% to 0.7% by weight of product based on the ester.

The properties of the end products depend essentially on their content of chemically bonded sulfur and phosphorus. The amount of the sulfur and phosphorus altogether should be about 2 to 30 weight percent in the final product based on the amount of the oil used. The halogen content of the sulfur and phosphorus compounds as well as the loses eventually occurring during the reaction process due to evaporation or hydrolysis are not calculated in the amounts indicated, but must be taken into account in the amounts of phosphorus halides and disulfurdichloride used in the process.

The proportion of sulfur to phosphorus is adjusted according to the free hydroxyl groups in the starting substances or, in the case of the polymerized and/or oxidized esters according to the degree of polymerization and oxidation. In unsaturated esters without free hydroxyl groups, the proportion of the sulfur to be reacted amounts to 7% to 20%, preferably to 10% to 15% by weight in the product, based on the amount of ester. The amount of sulfur to be reacted in the form of sulfur dichloride is generally 0.01% to 20% by weight of product, based on the ester. If the esters contain free hydroxyl groups such as oxidized unsaturated fatty acid esters or castor oil, the amount to be reacted is less, such as about 2.5% to 12% by weight of sulfur. In many cases, with respect to the blown oils, that means polymerized and oxidized oils, amounts to as low as 0.1% to 5% by weight will suffice to introduce a factization.

The amount of the phosphorus to be reacted depends likewise on the nature of the starting substances. Unpolymerized esters free of hydroxyl groups absorb maximally 2.2% by weight of phosphorus during the factice formation. This proportion is increased in oils containing hydroxyl groups or in blown oils to 2.5% to 7% by weight. However, the amount of the reacted phosphorus should not be less than 0.2% by weight, as products containing even less phosphorus do no longer differentiate substantially from the usual sulfur factices in their properties.

The actual amounts of disulfurdichloride and phosphorus halide to be used according to their content of sulfur and phosphorus can be substantially greater than the amounts indicated, in view of the possible losses due to evaporation. The excess of disulfurdichloride and phosphorus halide, no longer chemically bonded, can be removed again in a simple manner, for example, by treatment of the product with flowing dry air, by distillation at elevated temperature or reduced pressure or by extraction with organic solvents.

The mixing of the phosphorus halide and of the disulfurdichloride with the esters can be effected in a container equipped with a stirrer or in a kneading mill at room temperature. The reaction can be carried out in individual batches or continuously. The reaction starts immediately with some heat generation. It is advisable to add the phosphorus halide and disulfurdichloride in such amounts that the mixture does not become heated above the boiling point of the halides, or, if desired, to cool the mixture. During the time the phosphorus halide and the disulfurdichloride are added, the reaction medium is thoroughly admixed or kneaded. Advantageously, a mixture of the two halogen compounds are used. However, the process can also be effected in that first the esters are reacted with only one of the compounds to be used, for example, with the phosphorus halide, and then this product is admixed with the second reaction component, in this case with the disulfordichloride, thus effecting the solidification to factice-like masses.

The reaction can also be effected in the presence of anhydrous organic solvents such as hydrocarbons, chlorinated hydrocarbons, low-molecular-weight ethers, ketones or esters, in which case the ester as well as the phosphorus halide or disulfurdichloride can be dissolved in solvents. However, considerable amounts of the solvents are occluded during the solidification of the product. By using these diluents, frequently an end product is obtained, which can be easily reduced to small particles.

The factice-like products produced by the process of the invention are suitable as additives to rubber mixtures, lacquers, synthetics, adhesives and lubricants. They exhibit a very high decomposition point and they possess, in contrast to pure sulfur factices, excellent fire-resistant properties as well as an increased resistance to aging due to their phosphorus content. Depending on the selection of the starting materials, of the degree of oxidation or polymerization and of the amount of the phosphorus halides, and of the amount of the disulfurdichloride, the said products can be prepared in the form of viscous or solid, elastic or resinous materials and thus can be adapted to the respective utilizations mentioned above.

In the following examples, there are described several embodiments to illustrate the invention. However, it is to be understood that the invention is not limited to the specific embodiments.

EXAMPLES 1 TO 9

The oils indicated in the following table, served as starting materials. They were dried by heating briefly at temperatures of 80° C. to 100° C. under vacuum. The castor oil used in Examples 7 to 9 was thereafter heated at a temperature of 150° C., while simultaneously a finely divided current of dry air was bubbled therethrough utilizing a glass frit orifice, until the oil showed the indicated viscosity. The air supplied per hour was 120 to 180 liters of air based on 1 kg. of oil.

The oils were admixed at room temperature and under vigorous stirring, with a mixture of phosphorus trichloride and disulfurdichloride. The parts by weight given in the table were each based on 100 parts by weight of oil. In addition, the table contains data concerning the phosphorus, sulfur and chlorine content of the end products.

| Example | Ester | Parts by weight | | End product, percent | | |
|---|---|---|---|---|---|---|
| | | $PCl_3$ | $S_2Cl_2$ | P | S | Cl |
| 1 | Rape seed oil | 50 | 48 | 1.9 | 11.8 | 10.0 |
| 2 | do | 100 | 28 | 1.9 | 8.5 | 9.4 |
| 3 | Linseed oil | 50 | 30 | 1.7 | 7.9 | 9.0 |
| 4 | Castor oil | 100 | 40 | 4.0 | 11.5 | 9.5 |
| 5 | do | 32 | 34 | 3.7 | 11.9 | 5.9 |
| 6 | do | 14 | 15 | 2.5 | 6.3 | 7.3 |
| 7 | Blown castor oil [1] | 20 | 20 | 3.0 | 7.4 | 7.8 |
| 8 | do [1] | 100 | 28 | 4.6 | 8.0 | |
| 9 | do [2] | 100 | 8 | 5.9 | 3.0 | |

[1] Viscosity 2,000 cp. at 20° C.
[2] Viscosity 14,000 cp. at 20° C.

The final resins, which were extensively pulverized with a propeller stirrer while being stirred, had a certain odor of phosphorus halides still adhering to them and were spread out in a thin layer exposed to the air, whereupon the odor disappeared in a short time. In a still shorter time, the last traces of the phosphorus halides could be removed by treating the pulverized resin with a current of air.

The products obtained in the manner described were viscous-elastic, non-adhering resins of a yellow to brown color, containing between 10 and 30% of components soluble in organic solvents such as acetone, ethanol or trichloroethylene. The determination of these soluble parts consisting of low-polymer materials was obtained as in the factice test by an 8-hour extraction in a Soxhlet extractor.

The preceding examples are illustrative of the practice of the invention. It is to be understood, however, that other expedients known to those skilled in the art can be employed without departing from the spirit of the invention or the scope of the appended claims.

We claim:
1. A process for the production of factice-like products which comprises reacting (1) an anhydrous polyunsaturated compound selected from the group consisting of (a) an ester of an alkane polyol with an acid selected from the group consisting of unsaturated fatty acids of 8 to 22 carbon atoms, unsaturated hydroxy fatty acids of 8 to 22 carbon atoms, resinic acids and mixtures thereof, (b) blown oils and (c) and esters of fatty acids or resinic acids polymerized at 50 to 300° C. and then oxidized with 0.1 to 2 moles of active oxygen per mole of unsaturated acid ester with (2) an anhydrous mixture of sulfur dichloride and at least one phosphorus halide selected from the group consisting of $PCl_3$, $POCl_3$, $PCl_5$, $PSCl_3$, $PBr_3$, $POBr_3$, $PBr_5$ and $PSBr_3$, the amount of sulfur to be reacted in the form of sulfur dichloride being 0.01 to 20% by weight based on said ester and the amount of phosphorus to be reacted in the form a phosphorus halide being 0.2 to 7% by weight based on said ester and recovering the factice-like products.

2. The process of claim 1 wherein said phosphorus halide is phosphorus trichloride.

3. The process of claim 1 wherein said polyunsaturated compound is a triglyceride of an unsaturated fatty acid having 8 to 22 carbon atoms.

4. The process of claim 1 wherein said polyunsaturated compound is a triglyceride of an unsaturated hydroxy-fatty acid having 8 to 22 carbon atoms.

5. The process of claim 1 wherein said polyunsaturated compound is an oxidized polymer of a triglyceride of an unsaturated fatty acid having 8 to 22 carbon atoms prepared by blowing said triglyceride with air at a temperature of above 80° C.

6. The process of claim 1 wherein said polyunsaturated compound is blown castor oil prepared by blowing with air at a temperature of above 80° C.

7. The factice-like product produced by the process of claim 1.

References Cited
UNITED STATES PATENTS

| 1,669,491 | 5/1928 | Savage | 260—399 |
| 2,211,231 | 8/1940 | Henderson | 260—399 |
| 2,541,789 | 2/1951 | Stucker | 260—399 |

OTHER REFERENCES

The Merck Index, eighth edition, page 1004, 1968.

DANIEL D. HORWITZ, Primary Examiner

U.S. Cl. X.R.

252—46.7